United States Patent [19]

Todd

[11] E Re. 29,655

[45] Reissued May 30, 1978

[54] TELEPHONE ANSWERING DEVICE

[76] Inventor: Leonard M. Todd, 424 W. 119th St., New York, N.Y. 10027

[21] Appl. No.: 585,694

[22] Filed: June 10, 1975

Related U.S. Patent Documents

Reissue of:

[64] Patent No.: 3,445,600
Issued: May 20, 1969
Appl. No.: 388,091
Filed: Aug. 7, 1964

U.S. Applications:

[63] Continuation of Ser. No. 54,670, July 13, 1970, abandoned.

[51] Int. Cl.[2] ..... H04M 1/64
[52] U.S. Cl. ..... 179/6 R
[58] Field of Search ..... 179/6 R, 6 AC, 6 C

[56] References Cited

U.S. PATENT DOCUMENTS

| | | | |
|---|---|---|---|
| 2,937,237 | 5/1960 | Zanardo | 179/6 |
| 3,067,289 | 12/1962 | Zimmermann | 179/6 R |
| 3,127,474 | 3/1964 | Waldman | 179/6 |
| 3,133,992 | 5/1964 | Dickman | 179/6 |
| 3,226,478 | 12/1965 | Martin et al. | 179/6 |
| 3,248,482 | 4/1966 | Kamborian | 179/6 |
| 3,293,365 | 12/1966 | Mitsui | 179/6 |
| 3,310,629 | 3/1967 | Yamamoto et al. | 179/6 |
| 3,337,690 | 8/1967 | Martin | 179/6 |
| 3,344,234 | 9/1967 | Salzberg et al. | 179/6 |
| 3,426,152 | 2/1969 | O'Halloran et al. | 179/6 R |
| 3,501,592 | 3/1970 | Waldman | 179/6 R |
| 3,935,566 | 5/1960 | Karl | 179/6 |

OTHER PUBLICATIONS

Spratt: Simple Telephone Answering Machine, Wireless World, Jul. 1956, pp. 344–346.

*Primary Examiner*—Raymond F. Cardillo, Jr.

[57] ABSTRACT

A telephone answering device wherein ringing current *after a delay* causes *a bistable switch to latch that establishes* line seizure and starts an endless *announcement* tape, [to play a prerecorded] *playing an* announcement[. After the announcement, impulse generating means on the endless tape starts a message recorder. After predetermined message time, second impulse generating means further along the endless tape returns the device to standby. Each of a plurality of spaced apart impulse generating and time determining means on the message recorder tape passing an impulse sensitive element also returns the device to standby.] *to the caller; at the end of the answering cycle, an impulse unlatches the bistable switch, releasing line seizure and stopping the device. The stopping impulse is produced by means on the endless tape whose length thereby determines cycle duration or is produced by other timing means. The impulse from the endless tape stops the endless tape. At the conclusion of the announcement, the message recorder may start and the announcement loop may stop. Two amplifiers may be continuously coupled to the telephone line, one for announcement and one for message record.*

29 Claims, 9 Drawing Figures

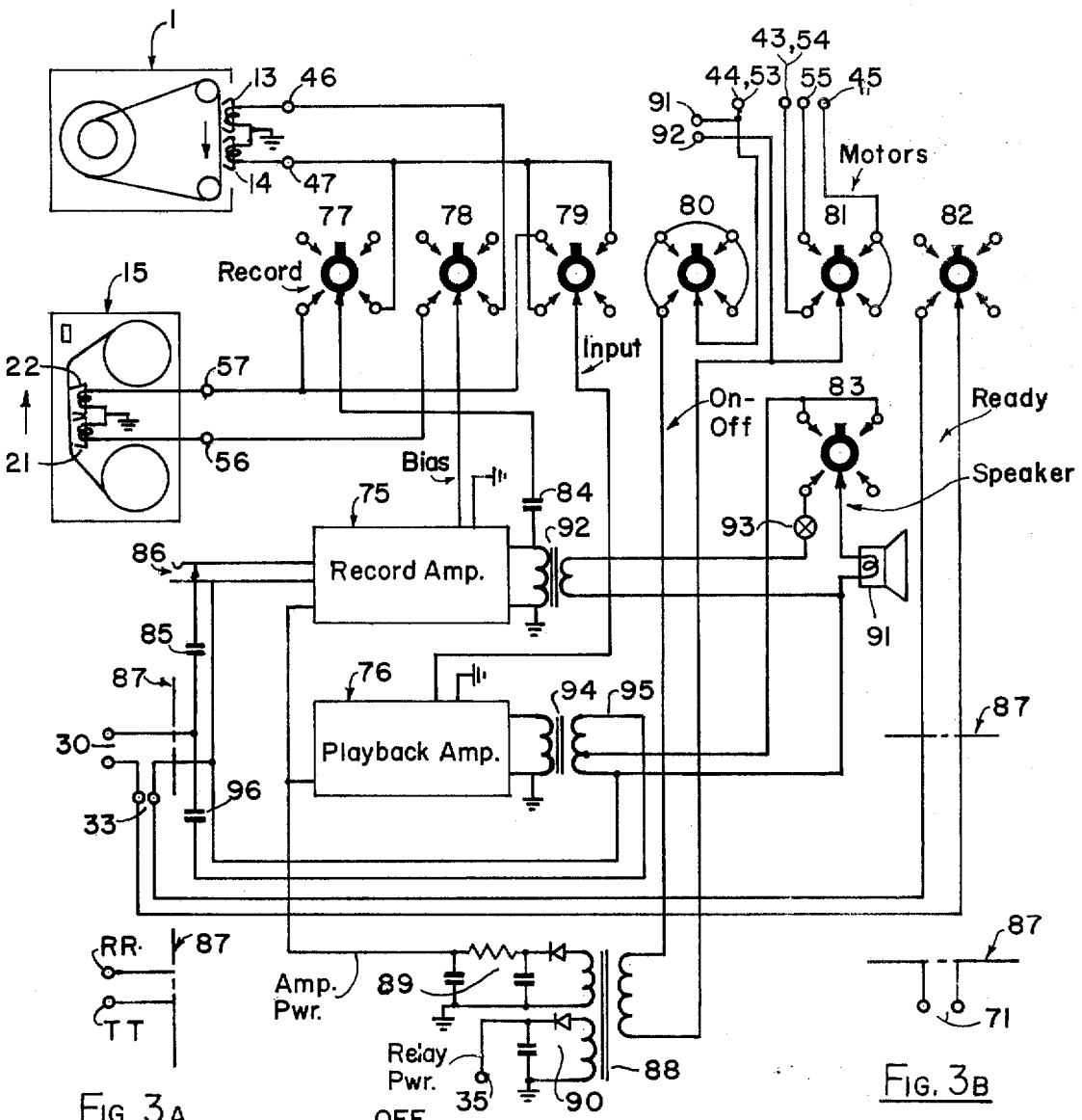
FIG. 3A
FIG. 3B
FIG. 3
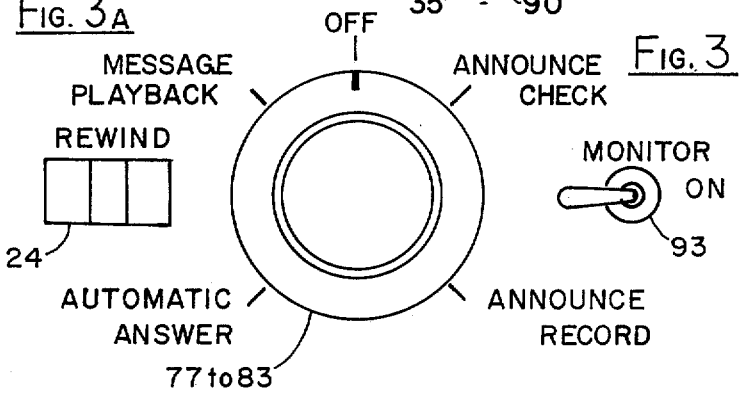
FIG. 4

TELEPHONE ANSWERING DEVICE

Matter enclosed in heavy brackets [ ] appears in the original patent but forms no part of this reissue specification; matter printed in italics indicates the additions made by reissue.

*This application is a continuation of the reissue application for U.S. Pat. No. 3,445,600, Ser. No. 54,670, filed July 13, 1970, that is now abandoned.*

This invention is a telephone answering device for performing a series of operations, line seizure, transmitting an announcement over the telephone line to a calling party, recording a calling party's message from the line, releasing line seizure and stopping the machine.

It is an object of this invention to accomplish these results in a novel manner with a minimum of equipment, thereby improving reliability and decreasing cost of equipment.

It is an object of this invention to utilize either the announcement tape or both the announcement tape and the message tape as determinants of announcement and message duration.

It is an object of this invention to utilize duration determining impulse generating portions appropriately spaced on said tapes to actuate impulse sensitive elements adjacent said tapes and switching means to turn on and off the appropriate functions of the answering device when actuated by said impulse generating portions at the conclusion or start of said announcement and message periods.

It is an object of this invention to connect the answering device directly to the telephone line where the tariffs permit or to the telephone line through the recorder coupler furnished by the telephone company under their tariffs.

It is another object of this invention to furnish means whereby the number of messages which have been recorded may be determined by the calling party.

In the drawings,

FIG. 3 is a circuit diagram of the record/playback head and erase head, amplifiers, switching arrangement of the amplifiers, and power supply for the amplifiers, motors and relays, used generally with the several tape deck configurations and modes of operation of timing of the announcement and messages of this invention.

FIG. 3A shows the termination of the signal portion of the amplifiers when used with the recorder coupler.

FIG. 3B shows the termination of the ready switch permitting automatic answering, when used with the recorder coupler.

FIG. 4 shows the panel diagram with markings indicating the function and position of the multigang rotary switch and the rewind switch.

Figure 1:
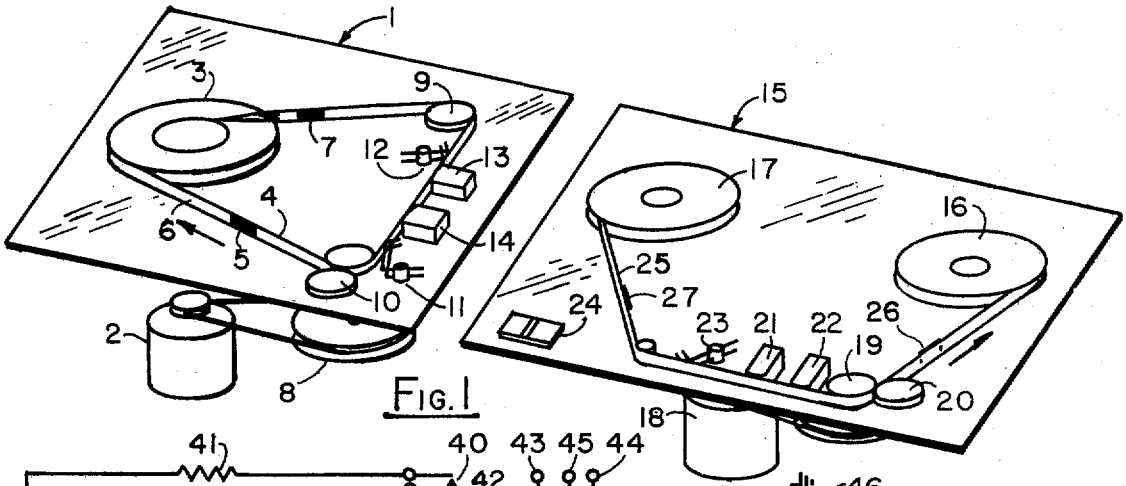
FIG. 1 is a view of the physical arrangement of the endless loop announcement tape deck and the message record tape deck.

FIG. 1 shows endless loop announcement tape deck 1, motor 2, endless loop reel 3, announcement tape 4, sensing tape 5 on outer portion of tape 4, message timing tape 6, sensing tape 7 on inner portion of tape 6, drive pulley 8, idler wheels 9 and 10, outer sensing tape switch 11, inner sensing tape switch 12, erase head 13, and record/playback head 14.

Figure 2:
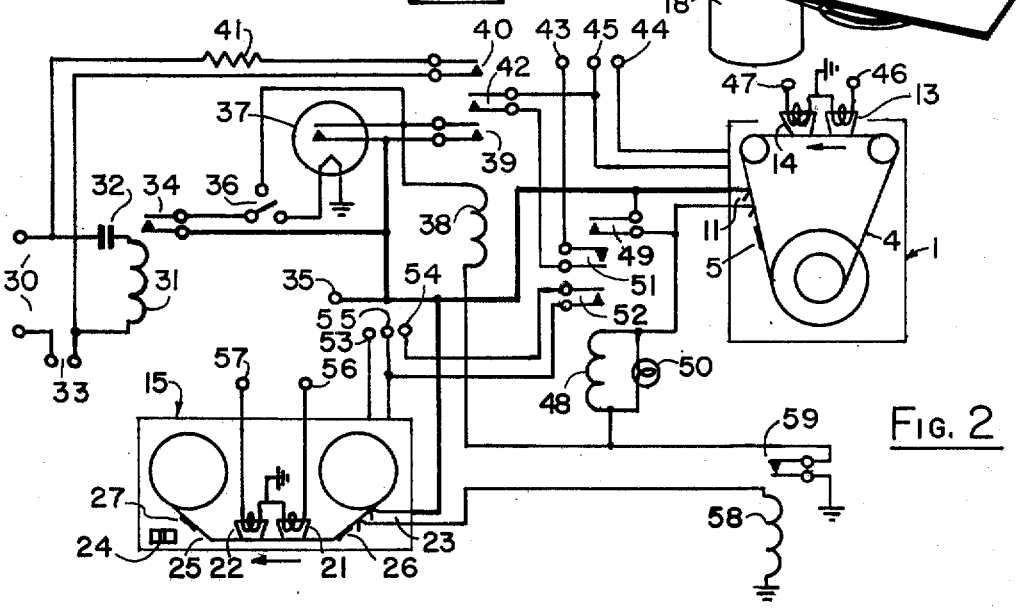
FIG. 2 is a circuit diagram of the switching arrangement of the tape decks wherein the endless loop announcement tape determines the duration of the announcement and the message tape determines the duration of the messages.
Figure 5:
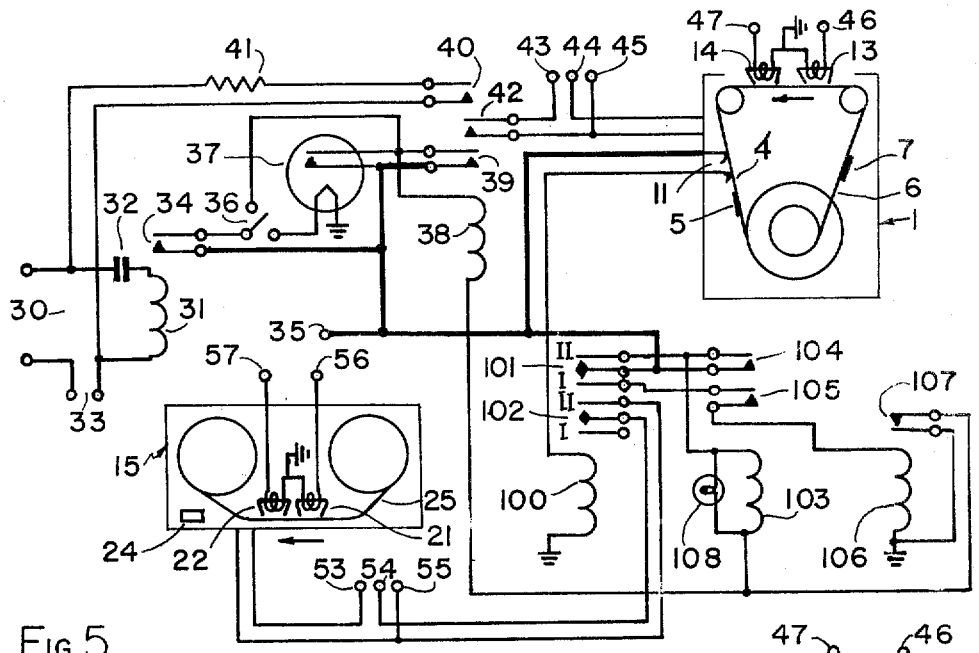
FIG. 5 is a circuit diagram of the switching arrangement of the tape decks wherein the device is connected directly to the telephone line and the endless tape times both the announcement and message duration utlizing one switch in the endless loop announcement tape deck.
Figure 6:
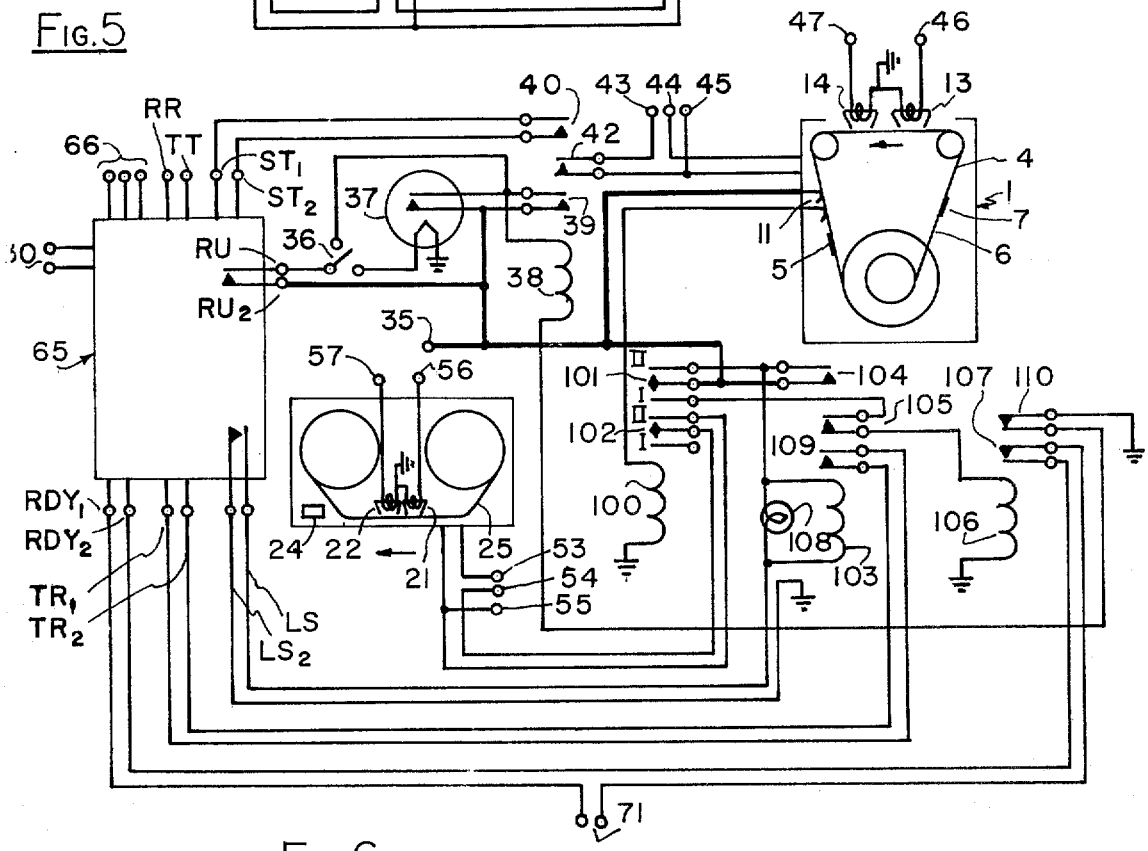
FIG. 6 is a circuit diagram of the switching arrangement of the tape decks wherein the device is used with the recorder coupler and the endless tape times both the announcement and message duration utilizing one switch in the endless loop announcement tape deck.

While two sensing tape switches are shown in the FIG. 1 endless loop announcement tape deck 1, in FIGS. 2, 5 and 6 only one sensing tape switch is required in announcement tape deck 1. Other impulse sensitive elements rather than sensing tape and switch may be used, for example, a transparent portion on the tape in conjunction with a light, photoelectric cell and relay, a hole or notch in the tape in conjunction with switch contacts on either side of the tape, closing through said hole or notch when these pass the switch contacts, a raised portion of tape actuating a moving arm switch, a cueing tone on the tape actuating a playback head and amplifier-relay, and so forth. Sensing tape means shown here is practical and preferred.

Message recording tape deck 15 contains supply reel 16, take up reel 17, drive motor 18, capstan 19, idler wheel 20, erase head 21, record/playback head 22 and sensing tape switch 23. Rewind lever 24 may be coupled mechanically to a reversing mechanism or electrically coupled to a reversing solenoid or reversing motors of usual design. Reel drives are of usual design. Tape 25 has many uniformly spaced apart sensing tape lengths located thereon of which 26 and 27 appear; between each of these, one message is recorded. This is for FIG. 2 only; sensing tape lengths are not used on message deck 15 for FIGS. 5 and 6. Furthermore, it is possible to use an endless loop for message record deck 15 using a plurality of equally spaced apart lengths of sensing tape as in FIG. 2 and a fast forward mechanism to return the tape to the initial position to play back messages. The endless loop message record is more practical with message decks of FIGS. 5 and 6 wherein no sensing tape is used for message duration determining in the message deck, but one length of sensing tape may be used to stop the tape at its initial position. In FIGS. 5 and 6 no sensing tape or switches are shown in message decks 15.

In endless loop announcement deck 1, endless tape 4 in FIG. 2 may be longer than one announcement, say 20 announcements repeated, with sensing tape lengths at the end of each announcement, where the words may appear ". . . you have 30 seconds to record your message. 19." The "19" indicates the 19th in a series of the machine's capacity of 20. A beep tone may be provided at the end of the announcement, on the announcement tape in FIG. 2. In FIG. 5, a beep tone, if desired, may be provided at the conclusion of the announcement, and at the conclusion of the message period. The recorder coupler described below will provide a beep tone automatically.

It is possible in this invention to use a conventional tape deck with supply and take up reels for the announcement tape deck using a plurality of equally spaced apart lengths of sensing tape for determining the duration of each announcement. That is, two similar decks 15. However, this is a cumbersome arrangement requiring rewinding of an additional tape.

In FIG. 2, telephone line 30 is connected to ring up relay 31 through condenser 32 and ready terminals 33 which are shunted as described later by a switch in FIG. 4. A ring up signal causes relay contacts 34 to close, causing relay current to flow from supply terminal 35 through single pole double throw switch 36, in the delay position, through the heater element of thermostatic time delay switch 37. After a delay of say 5 seconds, delay switch 37 contacts close, latching relay 38 by closing normally open contacts 39. With switch 36 in the no delay position, relay 38 latches immediately when ring up current is received.

Thermostatic delay switch 37 and relay 38 comprise time delay latching means and other time delay relays may be used, such as Heinemann Silic-O-Netic Relay, but this relay does not permit immediate latching on ring up if this is desired.

Contacts 40 of relay 38 cause line seizure of telephone line 30 through resistance 41 in the order of 300 ohms. Contacts 42 close and furnish alternating current to motor 2 of announce tape deck 1 through normally closed contacts 51 from terminals 43 and 44 which connect to switching and power supply in FIG. 3, described later, as does terminal 45 which is used to operate deck 1 for announcement record and check.

Announcement tape 4 starts its cycle and plays its announcement to the caller; at the end of this period, sensing tape switch 11 contacts are shorted by sensing tape 5. Erase head 13 and record/playback head 14 are connected to the switching arrangement and amplifiers in FIG. 3, described later, through terminals 46 and 47. Closure of switch 11 causes current flow through relay 48 and normally closed contacts 59 from supply terminal 35, latching this relay through normally open contacts 49. Lamp 50 remains lit during the message recording period, which is a convenience to the user when recording an announcement. Normally closed contacts 51 open and stop the motor of the announcement tape deck 1 and contacts 52 close and supply alternating current to the motor of message record deck 15 through terminals 53 and 54 which connect to switching and power supply in FIG. 3, described later as does terminal 55 which is used to operate message record deck 15 for message playback.

Tape 25 starts through a cycle to record a caller's message, through erase head 21 and record/playback head 22 which are connected to the switching arrangement and amplifiers in FIG. 5, described later, through terminals 56 and 57 respectively. At the conclusion of the message recording period, sensing tape 26 on message record tape 125 passes sensing tape switch 23, shorting the contacts and permitting relay current to flow from terminal 35 through relay 58 thereby opening normally closed contacts 59. Current through relays 38 and 48 is stopped and they unlatch, stopping message tape deck 15 and releasing line seizure through contacts 40. The device is now restored to normal automatic answering position.

A brief description of recorder coupler 65 in connection with this device can be understood with reference to FIG. 6. The functioning of this coupler is described in publications of the American Telephone & Telegraph Company and is a public record in accordance with tariffs filed with the Federal Communications Commission and various state public utility commissions. "Ready" terminals RDY 1 and RDY 2, when closed permit the actuation of the unit by a ring up signal. When this is received, contacts within the coupler connected to terminals LS and LS 2 close after line seizure. When a ring up signal is received, normally open contacts within the coupler, connected to terminals RU and RU 2 are closed. When "Start" terminals are shunted, ST and ST 1, line seizure is effected, permitting the cycle to begin. When RDY 1 and RDY 2 are opened for a minimum of two seconds, line seizure is released and the internal contacts connected to LS and LS 2 are opened. The coupler also provides unilateral transmission through terminals RR and TT from the answering announcement tape deck to the telephone line during the announcement period and transmission from the telephone line to the message record deck during the message record period, through the use of a unity gain amplifier and a turnaround relay. At the start of the message record period, a tone generator transmits a beep tone for one second to the telephone line upon being actuated by an impulse to the transfer terminals TR 1 and TR 2, which also turns the amplifier around. At the conclusion of the message record period, a beep tone for one second is again transmitted to the telephone line by the disconnect signal which comprises opening RDY 1 and RDY 2. Furthermore, with the ready terminals connected and a ring up signal is received, battery current to the associated telephone set is removed so that the set can be used to monitor the call but cannot record the conversation. Other terminals and functions are provided but are not essential for an understanding of this invention.

In FIG. 3 separate record amplifier 75 and playback amplifier 76 are used instead of using one amplifier to perform both functions with electrical switching thereby reducing circuit complexity, improving reliability and probably reducing costs. Three or four amplifiers can be used but the gain in efficiency over two amplifiers is probably nil. Both amplifiers are transistorized for instant response; electron tubes can be used if kept constantly heated or at standby warm conditions but such units work much hotter than transistors and the tubes require frequent replacement.

Rotary multigang switches 77 through 83 are ganged; for convenience in description, each switch is considered to be on a separate wafer. The five positions of switches 77 through 83 are shown in FIG. 4 and the terminals in each wafer correspond to the indicated functions, namely automatic answer, message playback, off, announce check and announce record. Switch 77 takes output from record amplifier 75 to record/playback heads 14 or 22 through condenser 84. The input to record amplifier comes from telephone line 30 or from the recorder coupler 65 terminals RR and TT in FIG. 3A, both through condenser 84 and microphone jack 86 which is used for recording announcements. Line 87 is the dividing line for either of the two inputs, the telephone line 30 or recorder coupler 65 input RR and TT, in FIGS. 3 and 3A.

Switch 78 sends high frequency bias to erase heads 13 or 21 from record amplifier 75. Switch 79 is for playback amplifier 76 input taken from either record/playback head 14 or 22. Switch 80 is an on-off switch for A.C. to the primary of power supply transformer 88, one secondary of which is used for filtered amplifier D.C. using rectifier, resistor, condenser network 89 and the other secondary for relay power supply using rectifier, condenser network 90 to terminals 35.

Switch 81 provides alternating current power to announcement and tape deck motors 2 and 18 on decks 1 and 15, from A.C. line terminals 91 and 92. Terminals 44 and 53 are common to both decks. Terminals 43 and 54 lead to normally open relay contacts of both decks. Terminals 55 and 45 lead to the playback deck 15 and announce deck 1, respectively, and override the relays for message playback and announcement record and check. Switch 82 is the ready switch, which, when closed allows ring up current to flow to relay 31 and the telephone signal to go to record amplifier 75 input and playback amplifier 76 output; line 87 shows the dividing line for either of the two conditions, to telephone line 30 or to recorder coupler 65 through terminals 71, permitting a shunt across RDY 1 and RDY 2 for a ready signal. See FIG. 3B.

Switch 83 controls the input to speaker 91; from record amplifier 75 output transformer 92 through switch 93 for monitoring the incoming calls; from playback amplifier 76 output transformer 94, for message playback and announcement check. Lead 95 couples the output of amplifier 76 to the line through condenser 96, carrying the announcement.

The physical arrangement of the answering device panel is shown in FIG. 5 wherein the large knob is coupled to the switch wafers 77 through 83 in the various phases of operation of the device. Rewind lever 24 has been described. Monitor switch 93 is a toggle switch on the panel.

Only one sensing tape switch is used in FIGS. 5 and 6 having the advantage of improved reliability since relay failure by sticking, etc. is less frequent than tape contact failure; the overall economy is better even though one more relay is needed. The operation of the arrangement of FIG. 5 from telephone line 30 through delay switch 37 and relay 38 is in all respects similar to the description for the FIG. 2 arrangement to the same point.

Contacts 42 of relay 38 close and start tape deck 1, motor 2, by allowing alternating current flow from terminals 43, 44 and 45 from FIG. 3. Tape 4 and 6 starts in its cycle and tape 4 plays the announcement to the caller. At the conclusion of the announcement period, sensing tape 5 closes contacts of sensing tape switch 11 sending a relay current impulse to mechanical latching relay 100, causing it to go from resting (standby and announcement) position I to position II, which is the message record position. This relay is Potter & Brumfield Series PA or PC which operates on a 30 millisecond impulse or longer. While electrical latching relays may be used instead of mechanical latching, the arrangement is more cumbersome.

In position II, relay current flows through contacts 101 of relay 100 to relay 103 and normally closed contacts 107 which latches through normally open contacts 104. In position II, alternating current flows to tape deck 15 through contacts 102 of relay 100 from terminals 53, 54 and 55 from FIG. 3.

Tape 6 which times the message record duration is blank and not magnetically coated to reduce noise; it should be graphite lubricated. *It may be ordinary lubricated magnetic tape.* This message record period is say 30 seconds. At the conclusion of the message period, sensing tape 7 which is also on the outer portion of tape 6 crosses sensing tape switch 11 closing the contacts and sending a second relay current impulse to mechanical latching relay 100, returning contacts 101 and 102 to resting position I. This stops current to message tape deck 15, stopping the tape 25.

Relay current now flows from terminal 35 through contacts 101 in position I through contacts 105 of relay 103 which are latched closed, to relay 106 which opens normally closed contacts 107 and unlatches relays 38 and 103. The announcement deck 1 stops through contacts 42 and line seizure is released through contacts 40, restoring the answering device to standby in normal automatic answering position. Lamp 108 is lit in position II, message record. Connections to the erase and bias heads, 46, 47, 56 and 57 are the same as in previous deck switching arrangement, FIG. 2 and go to FIG. 3.

In FIG. 6 telephone line 30 is connected to recorder coupler 65. Leads 66 are connected to the associated telephone set. Terminals RR and TT carry the announcement from and the messages to the answering device amplifiers and switching arrangement of FIGS. 3, 3A and 3B. Ring up current closes RU to RU 2, allowing current flow through and closing time delay switch 37 contacts, sending current to relay 38 through normally closed contacts 110 and closing normally open contacts 39, 40 and 42, and latching relay 38 after a delay period. Closed contacts 40 connected to ST 1 and ST 2 on coupler 65 start the cycle, opening RU and RU 2 after about 1 second and effect line seizure by allowing direct current flow in telephone line 30 and closing internal contacts connected to LS and LS 2 after line seizure. Contacts 42 permit alternating current to flow to announcement tape deck 1 from terminals 43 and 44 as described for the FIG. 2 arrangement, connecting to the FIG. 3 system.

Tape 4 and 6 starts in its cycle and tape 4 plays the announcement to the caller for say 15 seconds. At the conclusion of the announcement period, sensing tape 5 on the outer side of tape 4 closes contacts of sensing tape switch 11 sending a relay current impuse to mechanical latching relay 100, causing it to go from resting (standby and announcement) position I to message record position II. In this position, relay current flows through contacts 101 of relay 100 to relay 103 through terminals LS and LS 2 and internally closed contacts in coupler 65 which latches through normally open contacts 104; alternating current flows to message tape deck 15 through contacts 102 of relay 100 from terminals 53 and 54 from FIG. 3. Contacts 109 of relay 103 close, shunting terminals TR 1 and TR 2, turning the recorder coupler amplifier around and causing a one second beep tone to go to the telephone line 30. Contacts 105 close, readying operation of relay 106.

Tape 6 times the message duration of say 30 seconds, at the conclusion of which, sensing tape 7 which is also on the outer position of tape 6, crosses sensing tape switch 11, closing the contacts and sending a second relay current impulse to mechanical latching relay 100, returning contacts 101 and 102 to resting position I. Contacts 101 in position I stop A.C. flow to message tape deck 15, stopping message tape 25. Relay current now flows from terminal 35 through contacts 101 in position I through contacts 105 of relay 103 which are latched closed, to relay 106 which opens normally closed contacts 107 and 110.

Open contacts 110 unlatch relay 38, stopping A.C. to announce tape deck 1. Open contacts 107 interrupt current flow through terminals RDY 1 and RDY 2 and terminals 71 which are in series with closed ready switch in FIG. 4. Opening ready terminals causes a one second beep to be transmitted to the line and after about two seconds causes the opening of recorder coupler 65 internal contacts connected to terminals LS and LS 2, which unlatches relay 103. Lamp 108 is lit during the message record period.

Figure 7:
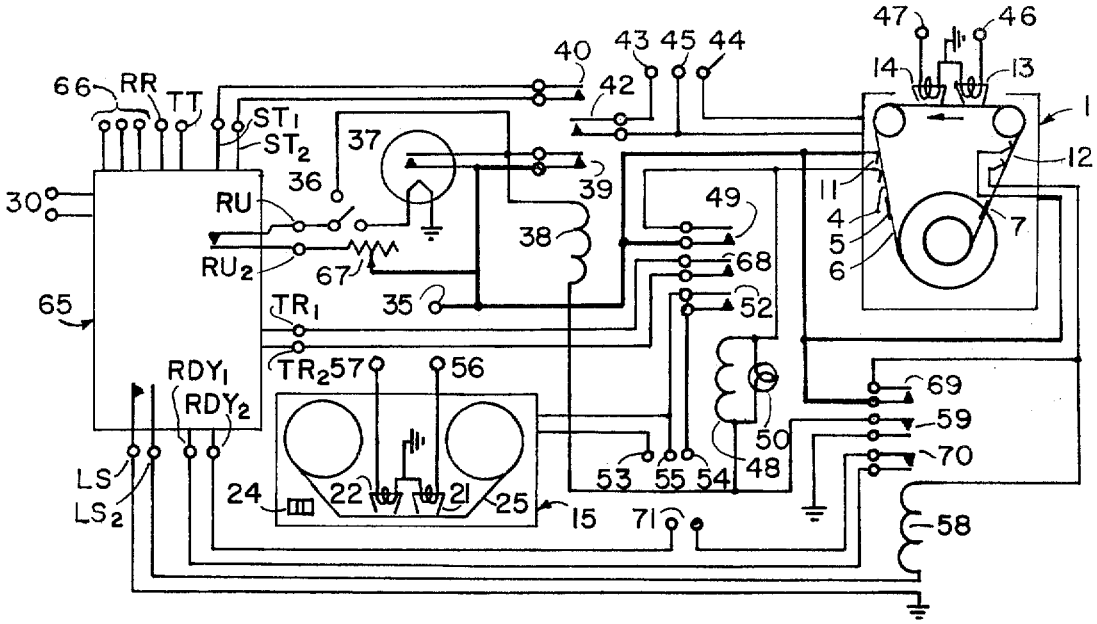
*FIG. 7 is a circuit diagram of the switching arrangement of the tape decks wherein the device is used with the recorder coupler and the endless tape determines both the announcement and message duration utilizing two switches in the endless loop announcement tape deck.*

*In FIG. 7, telephone line 30 is connected to recorder coupler 65. Leads 66 are connected to the associated telephone set. Terminals RR and TT carry the announcement from and the messages to the answering device amplifiers and switching arrangement, FIGS. 3, 3A and 3B. Ring up current closes internal contacts connected to RU and RU 2 permitting relay current flow from terminal 35 through variable resistance 67 which will vary the time delay, through delay position of switch 36 and heater element of thermostatic time delay switch 37. Contacts of switch 37 close after a brief delay period, say 5 seconds, causing current flow through relay 38 and normally closed contacts 59 which latches through closed contacts 39. Closed contacts 40 connected to ST 1 and ST 2 on coupler 65 start the cycle, opening RU and RU 2 after about a second, and effect line seizure by allowing direct current flow in telephone line 30, and closing internal contacts connected to LS and LS 2 after line seizure. Contacts 42 close and permit alternating current to flow to announcement tape deck 1 from terminals 43, 44 and 45 as described for the arrangement of FIG. 2, which connect to the switching, amplifiers and power of FIG. 3.*

*Announcement and message timing tape 4 and 6 revolves through the cycle. The announcement is transmitted to the line and at the conclusion of the announcement, sensing tape 5 closes contacts of sensing tape switch 11 permitting relay current to flow through relay 48 and normally closed contacts 59; contacts 49 close and latch the relay. Contacts 52 close and supply alternating current to the motor of message record deck 15 through terminals 53, 54 and 55 as described for the arrangement of FIG. 2 which connect to the switching, amplifiers and power of FIG. 3. Lamp 50 is lit during the message record period.*

*Contacts 68 close terminals TR 1 and TR 2 on recorder coupler 65 turning the amplifier around to message record mode and sending a one second beep to the line. The tape 6 which times the message record period says 30 seconds, may be ordinary lubricated magnetic tape but it is helpful that it be blank and uncoated, without magnetic material and lubricated, in order to minimize noise. It is possible to add contacts which will still the announce amplifier by shorting the announce amplifier or to cut the d.c. power supply to this amplifier, in FIG. 3 but this is a very minor refinement.*

*Sensing tape 7 at the conclusion of the message record period closes the contacts of sensing tape switch 12, allowing current to flow through relay 58 and terminals LS and LS 2 internally closed in coupler 65, latching the relay through contacts 69. Normally closed contacts 59 open, unlatching relays 38 and 48; this stops the announcement tape deck 1 and message record deck 15. Normally closed contacts 70 open, opening disconnect terminals RDY 1 and RDY 2 through terminals 71 which are shunted within switching, amplifiers and power of FIG. 3 by closed ready switch. After about two seconds, line seizure is released by the coupler 65, and coupler internal contacts open terminals LS and LS 2, unlatching relay 58 and restoring the answering device to automatic answering position.*

In some central offices, a premature hang up by the calling party, that is before the approximately 45 seconds of the cycle, will cause line seizure in the recorder coupler to be released. With minor wiring changes, the answering device may be connected to the recorder coupler to prevent response to ring up before the cycle is completed. It is also possible to wire the circuit of FIG. 2 to the recorder coupler to restart after premature hang up after the completion of only one announcement cycle, that is, 15 seconds or so.

It may be seen that the tape deck switching arrangement of FIG. 2 may be wired to a recorder coupler; timing the announcement on tape deck 1 and the message period on tape deck 15.

In another invention, the arrangements of FIGS. 5 and 6 are modified to use additional lengths of sensing tape on the announcement tape of deck 1 in conjunction with mechanical latching relays or stepping relays to perform additional functions, as for example, to include the time delay function on the announcement tape. It is also possible with the addition of lengths of sensing tape to actuate a tone oscillator or to ready the device for call-back of messages by a tone sent to the device by a caller.

It will be understood that electronic circuits and solid state switches, low current pilot relays and the like may be substituted or incorporated in the described circuits or used in conjunction with the impulses sensitive elements and timing arrangement described herein without departing from the spirit of the invention.

I claim:

1. A telephone answering device connected to the telephone line for reproducing an announcement and recording messages, comprising endless tape announcement reproducing means, an endless tape within said endless tape announcement reproducing means, time delay latching means actuated by ring up current in said telephone line causing line seizure and starting said endless tape announcement reproducing means, a first impulse generating element on said endless tape located at the conclusion of said announcement, a first impulse sensitive element adjacent said endless tape, message recording means, a message recording tape within said message recording means, a plurality of second impulse generating elements on said message recording tape spaced along said tape at the conclusion of each predetermined message interval, a second impulse sensitive element adjacent said message recording tape, second latching switching means actuated by the passage of said first impulse generating element across said first impulse sensitive element, latching said second latching switching means, stopping said endless tape announcement reproducing means and starting said message recording means, disconnect switching means actuated by the passage of *one of* said plurality of second impulse generating elements across said second impulse sensitive element, unlatching said time delay latching means which releases line seizure and unlatching said second latching switching means, thereby stopping said message recording means and readying said answering device for the next call, manually operated switching means, rewind means and playback means for playing back said recorded messages and means for recording and checking said announcement.

2. In the answering device of claim 1, message tape recording means comprising an endless loop message recording means and fast forward means to return said endless loop message recording means to the start for message playback.

3. A telephone answering device connected to the telephone line through a recorder coupler for reproducing an announcement and recording messages, comprising endless tape announcement reproducing means, an endless tape within said endless tape announcement reproducing means, a first length of sensing tape located on said endless tape at the conclusion of said announcement, a blank message timing portion on said endless tape, a second length of sensing tape located on said endless tape at the conclusion of said blank message timing portion, time delay latching means actuated by a ring up impulse from said recorder coupler causing line seizure through a start connection on said recorder coupler and starting said endless tape announcement reproducing means, a sensing tape switch actuated by said first and second lengths of sensing tape, message tape recording means, mechanical latching switching means actuated by the passage of said first length of sensing tape across said sensing tape switch, from a first resting position to a second message record position, starting said message tape recording means and giving a transfer signal to said recorder coupler, switching means latched into a record-disconnect position by said mechanical latching switching means in said second message record position, said mechanical latching switching means actuated by the passage of said second length of sensing tape across said sensing tape switch, from said second message record position back to said first resting position, disconnect switching means, said mechanical latching switching means giving an impulse in said first resting position through said latched switching means to said disconnect switching means, said disconnect switching means unlatching said time delay latching means and giving a disconnect signal to said recorder coupler, releasing line seizure and opening line seizure contacts within said recorder coupler, said opened line seizure contacts unlatching said latched switching means, said unlatched time delay latching means stopping said endless tape announcement reproducing means and said mechanical latching switching means in said first resting position, stopping said message tape recording means, thereby readying said answering device for the next call, manually operated switching means for answering, playback, announcement record and check, rewind means and playback means for playing back said recorded messages and means for recording and checking said announcement.

4. In the answering device of claim [4] *3*, message tape recording means comprising endless loop message recording means, an endless loop message tape within said endless loop message recording means, a length of sensing tape on said endless loop message tape, a sensing tape switch adjacent said endless loop message tape, fast forward means to return said endless loop message tape to the start, for message playback, a start switch, latching switching means actuated by said start switch and starting said fast forward means, said latching switching means unlatched by the passage of said sensing tape across said sensing tape switch, stopping said fast forward means.

5. A telephone answering device connected to the telephone line for reproducing an announcement and recording messages, comprising endless tape announcement reproducing means, an endless tape within said endless tape announcement reproducing means containing an announcement portion and a message duration timing portion, a first impulse generating element located on said endless tape at the conclusion of said announcement portion, a second impulse generating element located on said endless tape at the conclusion of said message duration timing portion, an impulse sensitive element adjacent said tape, message tape recording means, first switching means actuated by ring up current in said telephone line causing line seizure and starting said endless tape announcement reproducing means, second switching means actuated by the passage of said first impulse generating element across said impulse sensitive element at the conclusion of said announcement portion (a) to start said message tape recording means, said second switching means actuated by the passage of said second impulse generating element across said impulse sensitive element at the conclusion of said message duration timing portion (b) to stop said endless tape reproducing means, (c) to stop said message tape recording means, and (d) to open said first switching means to release line seizure, thereby restoring said device to standby automatic answering position.

*6. A telephone answering device connected to the telephone line for reproducing an announcement and recording messages, said announcement having a start and a conclusion, each of said messages being recorded for a message period having a start and a conclusion, comprising ring signal responsive means, endless tape announcement reproducing means, a length of endless tape within said endless tape reproducing means, said length of tape having said announcement recorded thereon, means to rotate said length of endless tape within said endless tape announcement reproducing means, impulse generating means located on said length of endless tape as said conclusion of said announcement, impulse sensitive means adjacent said endless tape, message tape recording means, message tape within said message tape recording means, first bistable switching means having a resting condition and a latched condition, second bistable switching means having a resting condition and a latched condition, unlatching means connected to said first and second switching means, a plurality of spaced apart message period timing impulse generating means on said message tape, second impulse sensitive means adjacent said message tape, said ring signal responsive means connected to said telephone line and to said first bistable switching means, said first bistable switching means connected to said telephone line and to said endless tape announcement reproducing means, said second bistable switching means connected to said message tape recording means and to said endless tape announcement reproducing means, said impulse sensitive means connected to said second bistable switching means, said second impulse sensitive means connected to said unlatching means; a ring signal received in said telephone line actuating said ring signal responsive means, said ring signal responsive means actuating said first bistable switch from said resting condition to said latched condition, establishing line seizure, starting said endless tape announcement reproducing means and causing said endless tape to rotate, said impulse generating means at said conclusion of said announcement crossing said impulse sensitive means producing an impulse actuating said second bistable switching means from said resting to said latched condition, said second bistable switching means in said latched condition starting said message tape recording means and stopping said endless tape announcement reproducing means; at said conclusion of said message period, one of said message period impulse generating means crossing said second impulse sensitive means producing an impulse actuating said unlatching means, said unlatching means then unlatching said first and second bistable switching means, into said resting conditions, stopping said message tape recording means,*

*releasing line seizure and restoring said answering device to standby.*

*7. A telephone answering device connected to the telephone line for reproducing an announcement and recording messages, each of said messages being recorded for a period having a start and a conclusion, comprising endless tape announcement reproducing means, a length of endless tape within said endless tape announcement reproducing means, rotating when said endless tape announcement reproducing means is turned on, said endless tape being a determinant of message duration and having a stopping point, said stopping point corresponding with said conclusion of said period for message recording, message tape recording means, automatic programming means comprising ring signal responsive means, bistable switching means having a resting condition and a latched condition, unlatching means for said bistable switching means, means to start said message tape recording means at said start of said period for message recording, an impulse generating element located on said endless tape at said stopping point, impulse sensitive means adjacent said endless tape, said impulse generating element passing said impulse sensitive means generating a stopping impulse, at said stopping point, and manual switching means to connect selectively said automatic programming means, said telephone line, said endless tape announcement reproducing means and said message tape recording means for automatic answer, message playback, announcement record and announcement check, in said automatic answering condition, said telephone line connected to said ring signal responsive means, said ring signal responsive means connected to said bistable switching means, said bistable switching means connected to said telephone line, to said endless tape announcement reproducing means, and to said means to start said message tape recording means, said impulse sensitive means coupled to said unlatching means, said unlatching means connected to said bistable switching means; a ring signal received in said telephone line actuating said ring signal responsive means, said ring signal responsive means actuating said bistable switching means from said resting condition to said latched condition, said latched bistable switching means (a) establishing line seizure, (b) starting said endless tape announcement reproducing means, and (c) enabling said means to start said message tape recording means, and starting said message tape recording means subsequent to latching of said bistable switching means; said endless tape rotating through said length, said impulse generating element crossing said impulse sensitive means at said conclusion of said period for message recording, producing said stopping impulse, said stopping impulse actuating said unlatching means to unlatch said bistable switching means into said resting condition, releasing line seizure, stopping said endless tape announcement reproducing means, deactuating said means to start said message tape recording means and stopping said message tape recording means, and returning said answering device to standby.*

*8. In a telephone answering device coupled to a telephone line for reproducing an announcement and recording messages, a telephone set associated with said telephone line, announcement reproducing means, message recording means, first and second amplifiers, each of said first and second amplifiers having an input and an output, first coupling means to couple said output of said first amplifier to said telephone line, second coupling means to couple said telephone line to said input of said second amplifier, switching means and automatic programming means, said switching means manually actuated, connecting selectively said announcement reproducing means, said first and second amplifiers, said first and second coupling means, said telephone line and said automatic programming means for automatic answering, message playback, announcement record and announcement check, said automatic programming means when in said automatic answering condition adapted to respond to an incoming ring signal in said telephone line and in ordered sequence to establish and release line seizure, to start and stop said announcement reproducing means, and to start and stop said message recording means; in said automatic answering condition, said announcement reproducing means connected by said switching means to said input of said first amplifier, said output of said second amplifier connected by said switching means to said message recording means, the improvement comprising said output of said first amplifier continuously coupled by said first coupling means and said switching means to said telephone line for transmitting said announcement to said telephone line in said automatic answering condition, said telephone line continuously coupled by said second coupling means and said switching means to said input of said second amplifier for transmitting said messages from said telephone line to said message recording means in said automatic answering condition, and said telephone line thence being connected to said associated telephone set.*

*9. A telephone answering device connected to the telephone line for reproducing an announcement and recording messages, comprising endless tape announcement reproducing means, a length of endless tape within said endless tape announcement reproducing means, said length of said endless tape being a determinant of message duration, impulse generating means on said endless tape, impulse sensitive means adjacent said endless tape, messge tape recording means, first and second amplifiers, each of said first and second amplifiers having an input and an output, first coupling means to couple said output of said first amplifier to said telephone line, second coupling means to couple said telephone line to said input of said second amplifier, automatic programming means, when in automatic answering condition adapted to respond to an incoming ring signal in said telephone line and in ordered sequence to establish and release line seizure, to start and stop said endless tape announcement reproducing means, and to start and stop said message tape recording means and switching means manually actuated to connect selectively said endless tape announcement reproducing means, said first and second amplifiers, said first and second coupling means, said telephone line and said automatic programming means for automatic answering, message playback, announcement recording and announcement check, said automatic programming means in said automatic answering condition responding to an incoming ring signal, establishing line seizure and starting said endless tape announcement reproducing means, said automatic programming means starting said message tape recording means subsequent to receipt of said ring signal, passage of said impulse generating means across said impulse sensitive means actuating said automatic programming means to stop said endless tape announcement reproducing means, to stop said message tape recording means and to release line seizure, restoring said telephone answering device to standby answering condition, said switching means in said automatic answering condition continuously coupling said endless tape announcement reproducing means to said input of said first amplifier, said output of said first amplifier to said first coupling means, and to said telephone line to transmit said announcement to said telephone line, said switching means continuously coupling said telephone line*

*to said second coupling means, to said input of said second amplifier, and said output of said second amplifier to said message tape recording means, to transmit said messages from said telephone line to said message tape recording means.*

*10. A telephone answering device connected to the telephone line for reproducing an announcement and recording messages, comprising endless tape announcement reproducing means, a length of endless tape within said endless tape announcement reproducing means, said length of said endless tape being a determinant of message duration, first impulse generating means on said endless tape, second message conclusion impulse generating means located on said endless tape, impulse sensitive means adjacent said endless tape, message tape recording means, first and second amplifiers, each of said first and second amplifiers having an input and an output, first coupling means to couple said output of said first amplifier to said telephone line, second coupling means to couple said telephone line to said input of said second amplifier, automatic programming means, when in automatic answering condition adapted to respond to an incoming ring signal in said telephone line and in ordered sequence to establish and release line seizure, to start and stop said messge tape recording means and switching means manually operated to connect selectively said endless tape announcement reproducing means, said message tape recording means, said first and second amplifiers, said first and second coupling means, said telephone line and said automatic programming means for automatic answering, message playback, announcement recording and announcement check, said automatic programming means in said automatic answering condition responding to an incoming ring signal, establishing line seizure and starting said endless tape announcement reproducing means, passage of said first impulse generating means across said impulse sensitive means actuating said automatic programming means to start said message tape recording means, passage of said second impulse generating means across said impulse sensitive means actuating said automatic programming means to stop said endless tape announcement reproducing means, to stop said message tape recording means and to release line seizure, restoring said telephone answering device to standby answering conditon, said switching means in said automatic answering condition continuously coupling said endless tape announcement reproducing means to said input of said first amplifier, said output of said first amplifier to said first coupling means and to said telephone line to transmit said announcement to said telephone line, said switching means continuously coupling said telephone line to said second coupling means and to said input of said second amplifier, and said output of said second amplifier to said message tape recording means, to transmit said messages from said telephone line to said message tape recording means.*

*11. A telephone answering device connected to the telephone line for reproducing an announcement and recording messages, each of said messages being recorded for a period having a start and a conclusion, comprising endless tape announcement reproducing means, a length of endless tape within said endless tape announcement reproducing means rotating when said endless tape announcement reproducing means is turned on, said endless tape having a stopping point, message tape recording means, automatic programing means comprising ring signal responsive means, bistable switching means having a resting condition and a latched condition, unlatching means for said bistable switching means, means to turn on said endless tape announcement reproducing means, means to start said message tape recording means at said start of a period for message recording, an impulse generating element located on said length of endless tape at said stopping point, impulse sensitive means adjacent said endless tape, said impulse generating element passing said impulse sensitive means producing a stopping impulse, means to stop said endless tape announcement reproducing means and means to determine duration of said message period, and manual switching means to connect selectively said automatic programming means, said telephone line, said endless tape announcement reproducing means and said message tape recording means for automatic answering, message playback, announcement recording and announcement check, said automatic programming means, when switched by said switching means in said automatic answering condition, said telephone line being connected to said ring signal responsive means, said ring signal responsive means connected to said bistable switching means, said bistable switching means connected to said telephone line, to said means to turn on said endless tape announcement reproducing means, to said means to start said message tape recording means and to said means to determine duration of said message period, said means to determine duration of said message period connected to said unlatching means, said unlatching means connected to said bistable switching means, said impulse sensitive means connected to said means to stop said endless tape announcement means; said ring signal responsive means responding to a ring signal in said telephone line to actuate said bistable switching means from said resting condition to said latched condition, said latched bistable switching means (a) establishing line seizure, (b) causing said means to turn on said endless tape announcement reproducing means to start said endless tape reproducing means, (c) enabling said means to start said message tape recording means, and starting said message tape recording means subsequent to latching of said bistable switching means, and (d) starting said means to determine duration of said message period, said endless tape rotating through said length, said impulse generating element on said endless tape crossing said impulse sensitive means producing a stopping impulse, actuating said means to stop said endless tape announcement reproducing means and stopping said reproducing means, at said conclusion of said message period, said means to determine duration of said message period actuating said unlatching means, unlatching said bistable switching means into said resting condition, releasing line seizure, deactuating said means to turn on said message tape recording means and stopping said message tape recording means, deactuating said means to determine duration of said message period and returning said answering device to standby.*

*12. In claim 11, a recorder coupler, an associated telephone set, said telephone line and said associated telephone set connected to said recorder coupler, first and second amplifiers, each of said amplifiers having an input and an output, said manual switching means in said automatic answering condition continuously coupling said endless tape announcement reproducing means to said input of said first amplifier and said output of said second amplifier to said message tape recording means, and continuously coupling said output of said first amplifier and said input of said second amplifier to each other and thence to said recorder coupler.*

*13. In claim 11, said length of endless tape comprising at least two portions of tape in sequence each portion with an impulse generating element thereon, each of said portions having a message sequence indication recorded thereon,*

*each of said portions corresponding to said duration of one message.*

*14. In claim 11, first and second amplifiers, each of said amplifiers having an input and an output, first coupling means to couple said output of said first amplifier to said telephone line, second coupling means to couple said telephone line to said input of said second amplifier, said manual switching means in said automatic answering condition continuously coupling said endless tape announcement reproducing means to said input of said first amplifier, said output of said first amplifier to said first coupling means and to said telephone line to transmit said announcement to said telephone line, said manual switching means continuously coupling said telephone line to said second coupling means, to said input of said second amplifier and said output of said second amplifier to said message tape recording means, to transmit said messages from said telephone line to said message tape recording means.*

*15. In claim 14, said second coupling means coupling said telephone line to said input of said second amplifier capacitively.*

*16. In claim 14, said first coupling means coupling said output of said first amplifier to said telephone line inductively.*

*17. In claim 11, said ring signal responsive means comprising an input circuit and delay means, said telephone line coupled to said input circuit, said input circuit coupled to said delay means and said delay means coupled to said bistable switching means, a ring signal appearing in said telephone line energizing said input circuit, said input circuit energizing said delay means while said ring signal continues, said ring signal continuing for a predetermined time period, said delay means then actuating said bistable switching means into said latched condition.*

*18. In claim 17, said delay means comprising a thermal delay switch, a heater and output contacts within said thermal delay switch, said contacts having an open resting condition and a closed condition, and a power source, said heater being energized by said input circuit from said power source while said ring signal continues, said contacts going to said closed condition when said ring signal continues for said predetermined time period, said closed contacts actuating said bistable switching means into said latched condition; when said ring signal stops, said heater being deenergized and said output contacts restoring to said open resting condition.*

*19. In claim 17, said delay means comprising a time delay relay, having a coil, an armature, output contacts having an open resting condition and a closed condition and a mechanism to slow said armature and contacts when moving from said open to said closed condition, said coil being energized by said input circuit while said ring signal continues for said predetermined time period, said closed contacts actuating said bistable switching means into said latched condition; when said ring signal stops, said armature and said contacts restoring to said open resting condition.*

*20. A telephone answering device connected to the telephone line for reproducing an announcement and recording messages, each of said messages being recorded for a period having a start and a conclusion, comprising endless tape announcement reproducing means, a length of endless tape within said endless tape announcement reproducing means, rotating when said endless tape announcement reproducing means is turned on, said endless tape being a determinant of message duration and having a stopping point, said stopping point corresponding with said conclusion of said period for message recording, message tape recording means, automatic programming means comprising ring signal responsive means, bistable switching means having a resting condition and a latched condition, unlatching means for said bistable switching means, means to turn on said endless tape announcement reproducing means, means to start said message tape recording means at said start of said period for message recording, an impulse generating element located on said endless tape at said stopping point, impulse sensitive means adjacent said endless tape, said impulse generating element passing said impulse sensitive means generating a stopping impulse, at said stopping point, and manual switching means to connect selectively said automatic programming means, said telephone line, said endless tape announcement reproducing means and said message tape recording means for automatic answer, message playback, announcement record and announcement check, in said automatic answering condition, said telephone line connected to said ring signal responsive means, said ring signal responsive means connected to said bistable switching means, said bistable switching means connected to said telephone line, to said means to turn on said endless tape announcement reproducing means, and to said means to start said message tape recording means, said impulse sensitive means coupled to said unlatching means, said unlatching means connected to said bistable switching means; a ring signal received in said telephone line actuating said ring signal responsive means, said ring signal responsive means actuating said bistable switching means from said resting condition to said latched condition, said latched bistable switching means (a) establishing line seizure, (b) causing said means to turn on said endless tape announcement reproducing means to start said endless tape announcement reproducing means, and (c) enabling said means to start said message tape recording means, and starting said message tape recording means subsequent to latching of said bistable switching means; said endless tape rotating through said length, said impulse generating element crossing said impulse sensitive means at said conclusion of said period for message recording, producing said stopping impulse, said stopping impulse actuating said unlatching means to unlatch said bistable switching means into said resting condition, releasing line seizure, deactuating said means to turn on said endless tape announcement reproducing means and stopping said endless tape announcement reproducing means, deactuating said means to start said message tape recording means and stopping said message tape recording means, and returning said answering device to standby.*

*21. In claim 14, a recorder coupler, an associated telephone set, said telephone line and said associated telephone set connected to said recorder coupler, first and second amplifiers, each of said amplifiers having an input and an output, said manual switching means in said automatic answering condition continuously coupling said endless tape announcement reproducing means to said input of said first amplifier and said output of said second amplifier to said message tape recording means, and continuously coupling said output of said first amplifier and said input of said second amplifier to each other and thence to said recorder coupler.*

*22. In claim 20, said length of endless tape comprising at least two portions of tape in sequence each portion with impulse generating elements thereon, each of said portions having a message sequence indication recorded thereon, each of said portions corresponding to said duration of one message.*

*23. In claim 20, said length of endless tape having a magnetic coating, said length comprising an announce-*

*ment portion and a message duration determining portion, at least a part of said magnetic coating being removed from said message duration determining portion.*

*24. In claim 20, said ring signal responsive means comprising an input circuit and delay means, said telephone line coupled to said input circuit, said input circuit coupled to said delay means and said delay means coupled to said bistable switching means, a ring signal appearing in said telephone line energizing said input circuit, said input circuit energizing said delay means while said ring signal continues, said ring signal continuing for a predetermined time period, said delay means then actuating said bistable switching means into said latched condition.*

*25. In claim 24, said delay means comprising a thermal delay switch, a heater and output contacts within said thermal delay switch, said contacts having an open resting condition and a closed condition, and a power source, said heater being energized by said input circuit from said power source, while said ring signal continues, said contacts going to said closed condition when said ring signal continues for said predetermined time period, said closed contacts actuating said bistable switching means into said latched condition; when said ring signal stops, said heater being deenergized and said output contacts restoring to said open resting condition.*

*26. In claim 24, said delay means comprising a time delay relay having a coil, an armature, output contacts having an open resting condition and a closed condition and a mechanism to slow said armature and contacts when moving from said open to said closed condition, said coil being energized by said input circuit while said ring signal continues for said predetermined time period, said closed contacts actuating said bistable switching means into said latched condition; when said ring signal stops, said armature and said contacts restoring to said open resting condition.*

*27. In claim 20, first and second amplifiers, each of said amplifiers having an input and an output, first coupling means to couple said output of said first amplifier to said telephone line, second coupling means to couple said telephone line to said input of said second amplifier, said manual switching means in said automatic answering condition continuously coupling said endless tape announcement reproducing means to said input of said first amplifier, said output of said first amplifier to said first coupling means and to said telephone line to transmit said announcement to said telephone line, said manual switching means continuously coupling said telephone line to said second coupling means, to said input of said second amplifier and said output of said second amplifier to said message tape recording means, to transmit said message from said telephone line to said message tape recording means.*

*28. In claim 27, said second coupling means coupling said telephone line to said input of said second amplifier capacitively.*

*29. In claim 27, said first coupling means coupling said output of said first amplifier to said telephone line inductively.*

* * * * *